United States Patent [19]

Koenig

[11] 4,064,360

[45] Dec. 20, 1977

[54] HIGH SPEED DIGITAL SWITCH

[75] Inventor: Harry J. Koenig, San Diego, Calif.

[73] Assignee: The United States of America as represented by the Secretary of the Navy, Washington, D.C.

[21] Appl. No.: 703,038

[22] Filed: July 6, 1976

[51] Int. Cl.² ............................ H04J 3/00; H04Q 11/04
[52] U.S. Cl. .................................... 178/3; 179/15 AQ
[58] Field of Search ............ 179/18 ES, 15 A, 15 AQ, 179/15 AT, 15 AL, 15 BS; 178/3

[56] References Cited

U.S. PATENT DOCUMENTS

| | | | |
|---|---|---|---|
| 3,736,381 | 5/1973 | Johnson et al. | 179/15 AQ |
| 3,760,103 | 9/1973 | Condon | 179/15 AQ |
| 3,956,593 | 5/1976 | Collins et al. | 179/15 A |

Primary Examiner—Thomas A. Robinson
Attorney, Agent, or Firm—R. S. Sciascia; G. J. Rubens; H. Fendelman

[57] ABSTRACT

A switching system for rapidly configuring transmission paths between computer equipments for high speed digital information in parallel form couples the input of a parallel-to-serial (P/S) converter to the output of each equipment providing information and the output of a serial-to-parallel (S/P) converter to the input of each equipment receiving information. A digital switch rapidly configures information transmission channels between its inputs and outputs in response to instructions from a configuration control. Each switch input is coupled to the output of a P/S converter, and each switch output is coupled through a switch output lead to the input of an S/P converter. A clock provides a periodic clock signal to each P/S converter through an adjustable delay control and to each S/P converter through a clock lead, wherein the electrical lengths of the switch output lead and clock lead coupled to the same S/P converter are equal. Each transmission path through the system is coupled between a P/S converter and an S/P converter which are synchronously operated.

8 Claims, 4 Drawing Figures

HIGH SPEED DIGITAL SWITCH

BACKGROUND OF THE INVENTION

The invention pertains to a switching system for rapidly configuring high speed transmission paths for digital information in parallel form, and particularly to such a system employing parallel-to-serial and serial-to-parallel digital converters which are synchronously operated. There are increasing applications for a switching system for rapidly coupling large quantities of high-speed digital information in parallel form between computer equipments. For example, in the Navy Tactical Data System (NTDS) it would be very desirable to develop a means for providing multiple data transmission paths between NTDS computer equipments which would improve over present NTDS switching means. Presently, NTDS equipments are usually interconnected by heavy and bulky cables having pin connectors, which must manually be inserted into patch boards. Such means may require substantial allotments of manhours, space and weight support. A switching means capable of rapidly configuring transmission paths for digital data in parallel form between NTDS computer equipments, wherein the rate of data transmission may exceed 100 kilowords per second for each path, each word being up to 36 bits in length, could provide an improvement over such present means.

Synchronously operated parallel-to-serial (P/S) converters and serial-to-parallel (S/P) converters may be employed in providing an improved switching system. To synchronously operate a P/S converter and an S/P converter, periodic clock signals are transmitted to both converters with such timing that the converters are always clocked synchronously, the P/S converter generating a digital pulse output each time the S/P converter accepts a digital pulse input. If the output of the P/S converter is coupled directly through a data transmission path to the input of the S/P converter, synchronization allows the generation of data bit time slots at the P/S converter in a one to one relation to the clock transitions of the S/P converter.

SUMMARY OF THE INVENTION

The invention discloses a system for rapidly switching digital information in parallel form between computer equipments, wherein the system employs synchronously operated P/S and S/P converters. The input of each P/S converter is coupled to the output of a computer equipment, the output of each P/S converter is coupled through a data transmission path comprising an input lead, a switchable channel, and an output lead, to the input of an S/P converter, and the output of each S/P converter is coupled to the input of a computer equipment. A configuration control and switch are provided to rapidly configure a path between a computer equipment output and a computer equipment input by switching a channel between the input lead coupled through a P/S converter to the computer equipment output, and the output lead coupled through an S/P converter to the computer equipment input. A clock source generates a periodic clock signal which is coupled to the P/S converters through clock leads and adjustable delay controls, and to each of the S/P converters through other clock leads, wherein the electrical lengths of the output lead and the clock lead coupled to the same S/P converter are equal. In the switching system of the invention any P/S converter will operate synchronously with any S/P converter whenever a data transmission path is configured between them. The switching system may receive and transmit digital information in parallel form at a rate in excess of 100 kilowords per second, each word being up to 36 bits in length, through each configured path and is suitable for interconnecting computer equipments of the NTDS. An embodiment of the invention may provide a 90% saving in space and weight support requirements over presently used NTDS switching equipment and may be operated by computer instruction. However, it is not intended that the present invention be limited to NTDS applications.

STATEMENT OF THE OBJECTS OF THE INVENTION

It is an object of the invention to provide a new and improved switching system for transmitting a large amount of digital data per unit time.

Another object of the invention is to provide a new and improved switching system for transmitting a large amount of digital data per unit time between computer equipments having parallel inputs and outputs.

Another object is to provide a new and improved switching system for transmitting a large amount of digital data unit time which employs parallel-to-serial and serial-to-parallel converters which are synchronously operated.

Another object is to provide a new and improved means for interconnecting computer equipments of the NTDS.

Other objects, advantages and novel features of the invention will become apparent from the following detailed description of the invention when considered in conjunction with the accompanying drawings.

DESCRIPTION OF THE PREFERRED EMBODIMENT

Figure 1:
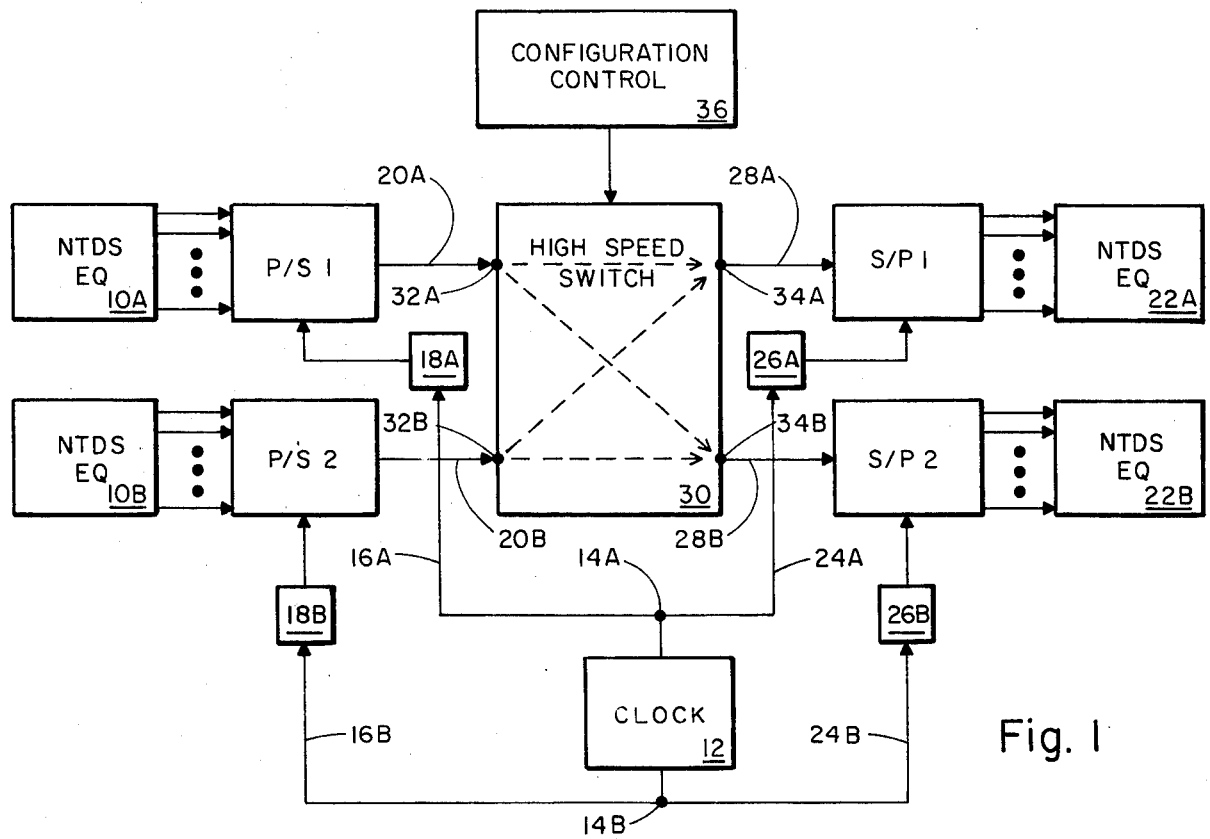
FIG. 1 is a block diagram illustrating an embodiment of the switching system of the present invention.

Referring to FIG. 1 there are shown Navy Tactical Data System (NTDS) computer equipments 10A and 10B, which may generate outputs comprising digital information in parallel form at a rate in excess of 100 kilo words per second, of words up to 36 bits in length. The parallel output terminals of NTDS equipment 10A are coupled to the parallel input terminals of parallel-to-serial (P/S) converter P/S 1, and the output terminals of equipment 10B are coupled to the input of another P/S converter, P/S 2, both P/S 1 and P/S 2 being capable of receiving digital information in parallel form at a rate in excess of 100 kilo words per second, of words up to 36 bits in length, and of transmitting received digital information in serial form at a rate in excess of 10 mega bits per second.

The rate of serial transmission is equal to the frequency of the sinusoidal clock signal generated by clock 12 having output terminals 14A and 14B, which couples clock pulses to P/S 1 through clock lead 16A and adjustable delay control 18A, and to P/S 2 through clock lead 16B and adjustable delay control 18B. P/S 1 couples a digital pulse into switch input lead 20A each time it receives a clock pulse, and P/S 2 couples a digital pulse into lead 20B each time it is clocked. If the clock signal has a frequency of 10 MHz per second each P/S converter couples out digital pulses of 100 nanoseconds duration. Each of the adjustable delay controls 18A and 18B is provided to allow adjustment of the phase of clock pulses coupled to its P/S converter, and is additionally provided with buffering circuitry to match the impedance of the clock leads 16A and 16B to their respective converters. Leads 16A, 16B, 20A and 20B may each comprise a coaxial cable of 50 ohms resistance having a selected electrical length. All clock signals coupled out of clock ouput terminals 14A and 14B are in phase, but the phase of the clock signal at each P/S converter is determined by the electrical length of its respective clock lead and by the adjustment of its respective delay control.

Each of the P/S converters P/S 1 and P/S 2 may comprise an embodiment of the invention disclosed in my application Ser. No. 673,230, for a "Parallel-to-Serial Digital Converter" filed Apr. 2, 1976. While the embodiment illustrated in FIG. 1 shows two NTDS equipments 10A and 10B providing digital inputs in parallel form to a switching system employing two P/S converters, in a modification of the invention in excess of 200 different NTDS equipment outputs could simultaneously be coupled through the switching system through in excess of 200 P/S converters.

FIG. 1 shows NTDS equipment 22A receiving an input comprising digital information in parallel form from serial-to-parallel (S/P) converter S/P 1, and NTDS equipment 22B receiving an input in parallel form from S/P converter S/P 2. Each of the S/P converters may receive serial information at a rate equal to the frequency of the sinusoidal clock signal generated by clock 12, which couples clock pulses to S/P 1 through clock lead 24A and impedance buffer 26A, and to S/P 2 through clock lead 24B and impedance buffer 26B. Impedance buffers 26A and 26B are provided to match the impedance of the clock leads 24A and 24B to their respective converters. S/P 1 receives a digital pulse from switch output lead 28A each time it is clocked by a clock pulse, and S/P 2 receives a digital pulse from lead 28B each time it is clocked. Each pulse received by either S/P 1 or S/P 2 comprises one of the output pulses of one of the P/S converters. S/P 1 and S/P 2 each has the capability to receive digital information in serial form at a rate in excess of 10 mega bits per second and to transmit digital information in parallel form to its coupled NTDS equipment at a rate in excess of 100 kilo words per second of words up to 36 bits in length.

Each of the S/P converters S/P 1 and S/P 2 may comprise an embodiment of the invention disclosed in my application Ser. No. 682,010, for a "Serial-to-Parallel Converter" filed May 3, 1976. While FIG. 1 shows two NTDS equipments 22A and 22B for purposes of illustration, in a modification of the invention in excess of two-hundred different NTDS equipment inputs could simultaneously receive digital information through the switching system through in excess of 200 S/P converters.

High speed switch 30 is provided with switch inputs 32A and 32B and switch outputs 34A and 34B and is responsive to signals from configuration control 36 to rapidly configure or reconfigure any of four possible internal data transmission channels: between input 32A and output 34A; between input 32B and output 34A; between input 32A and output 34B; and between input 32B and output 34B. Since the outputs of P/S converters P/S 1 and P/S 2 are coupled to inputs 32A and 32B through switch input leads 20A and 20B, respectively, and since outputs 34A and 34B are coupled to the inputs of S/P converters S/P 1 and S/P 2 through switch output leads 28A and 28B, respectively, it is evident that switch 30 can configure four data trasmission paths through the switching system, to couple each of the NTDS equipments, 10A and 10B, with either of the NTDS equipments, 22A and 22B, each path being configured by a particular signal from control 36, which may be a control device responsive to computer instructions. Each configured channel of switch 30 has the same electrical length so that the same amount of time is required for a digital pulse to be coupled from any switch input to any switch output. Two channels may be simultaneously configured through switch 30, from each P/S converter to each S/P converter, so that it must be capable of transmitting data at a rate in excess of 20 mega bits per second.

A suitable high speed switch 30 may comprise an embodiment of the invention disclosed in my application, Ser. No. 650,104, for a "Multiple-Channel Data Switch", filed Jan. 19, 1976. While switch 30 of FIG. 1 is provided with only two inputs and two outputs, a modification of the invention may comprise a high speed switch having in excess of 200 inputs and in excess 200 outputs for simultaneously configuring in excess of two-hundred digital transmission paths between in excess of two-hundred NTDS equipment outputs and in excess of 200 NTDS equipment inputs.

To configure any of the four data paths through the switching system it is necessary, as previously stated, that the P/S converter and the S/P converter coupled by the path be operated synchronously. For data transmitted at 10 MHz, the phase tolerance, the allowable time between the arrival of each clock pulse at the P/S and at the S/P converter in the path, is 3 nanoseconds. Furthermore, to enable the switching system to rapidly configure each path, it is necessary to eliminate the need to synchronize a P/S and S/P converter each time a data transmission path is configured or reconfigured between them.

In the switching system the physical length of lead 28A, coupling digital pulses to S/P 1, is made equal to lead 24A, coupling clock pulses. Similarly, leads 28B and 24B are made equal in physical length, although the length of 28A and 24A may be different from the length of 28B and 24B so that S/P 1 and S/P 2 may be located at different positions. If leads 28A, 28B, 24A and 24B is each a coaxial cable of 50 ohms resistance, the electrical lengths of 28A and 24A are equal, and the electrical lengths of 28B and 24B are equal. Since the electrical lengths of all channels through switch 30 are equal, as previously stated, the time phase of S/P 1 is equal to the phase of S/P 2 for data coupled to switch 30 from a selected P/S converter, for example, P/S 1. If, for example, 28A is longer than 28B, so that more time is required for each digital pulse to arrive at S/P 1, the delay is compensated by the equal delay in the arrival of clock pulses through 24A. If P/S 1 is initially synchronized with either of the S/P converters, either S/P converter can subsequently be switched into a data path with P/S 1 without further synchronization. P/S 1 may be synchronized with an S/P converter by means of an oscilloscope and an adjustment of delay control 18A. By similar means, P/S 2 may be adjusted so that it has the same time phase as P/S 1, and either P/S converter can subsequently be switched into a data path with either S/P converter without further synchronization.

Figure 2:
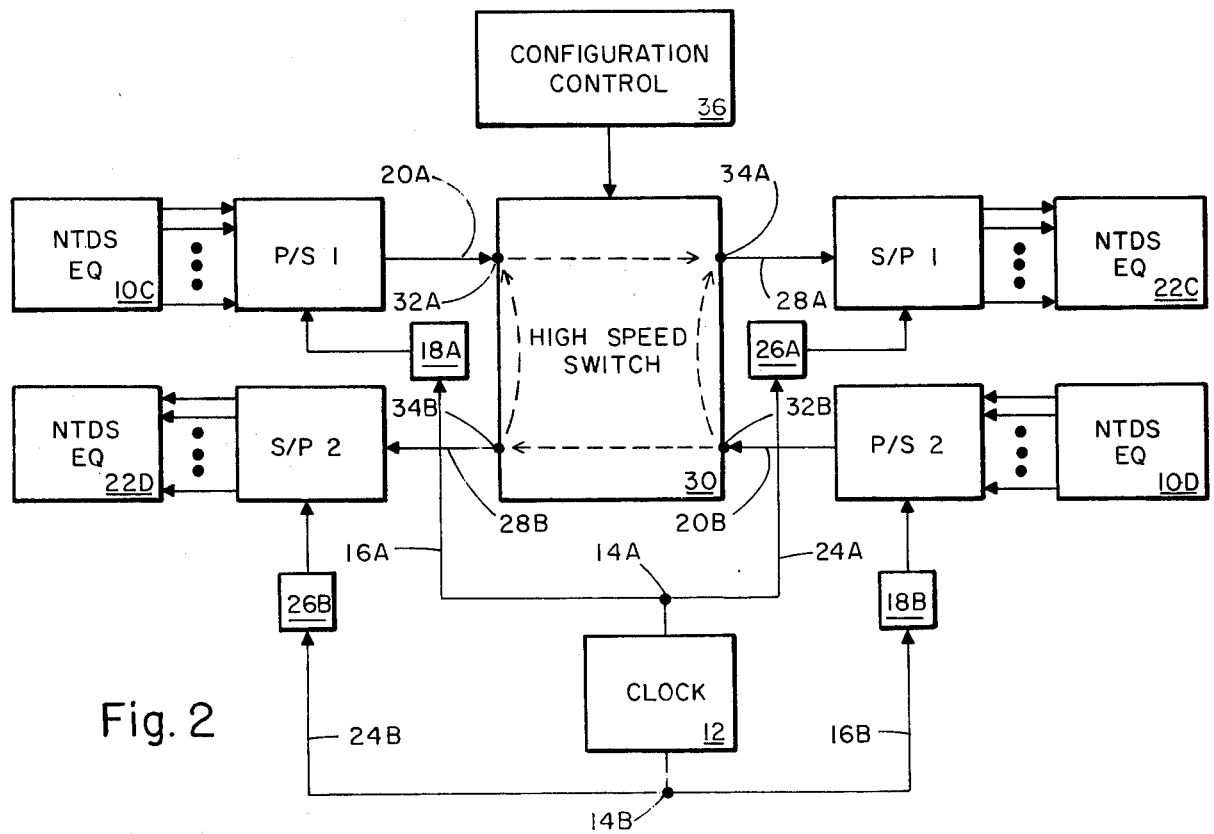
FIG. 2 is a block diagram illustrating a modified application for the embodiment of FIG. 1.

FIG. 2 illustrates the switching system of FIG. 1 wherein NTDS equipment output 10C and NTDS equipment input 22D are the respective output and input of the same NTDS equipment, and output 22C and input 10D are the output and input, respectively, of another NTDS equipment. By configuring a data channel between switch input 32A and switch output 34A of switch 30, between switch input 32B and switch output 34B the switching system provides two-way communication between two NTDS computer equipments. While only two NTDS equipments are illustrated in FIG. 2, a modification of the embodiment of FIG. 2 enables simultaneous two-way data transmission between in excess of one-hundred NTDS equipments through in excess 200 two-way transmission paths.

Figure 3:
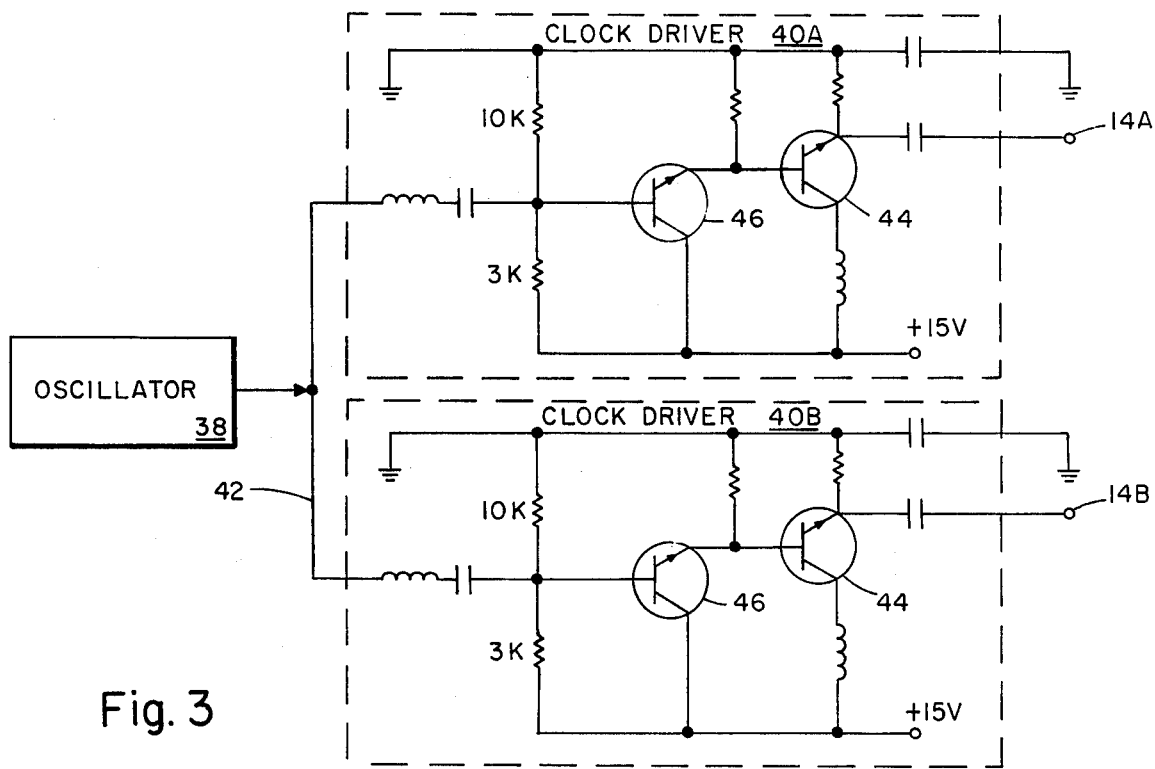
FIG. 3 is a schematic diagram illustrating a clock for the embodiment of FIG. 1.

FIG. 3 illustrates oscillator 38 coupling a sinusoidal signal of suitable frequency to clock drivers 40A and 40B through conducting path 42. If the clock drivers are mounted on a printed circuit board, path 42 may be printed circuit strip line to provide uniform impedance. In each of the clock drivers transistor 44 is coupled to transistor 46 as an emitter follower. The emitter follower mode of connection provides each of the clock drivers with a very wide bandwidth, so that the input to each of the clock drivers may be power amplified with very little distortion, even for an input signal in excess of 10 MHz. The output of clock driver 40A is coupled to clock output terminal 14A, and the output of clock driver 40B is coupled to clock output terminal 14B. In a modification of the invention employing in excess 200 P/S converters and in excess of 200 S/P converters, clock drivers 40A and 40B may each provide a clock signal to sixteen P/S and S/P converters, and similar clock drivers may be coupled to conducting path 42 to provide the remaining clock signals.

Figure 4:
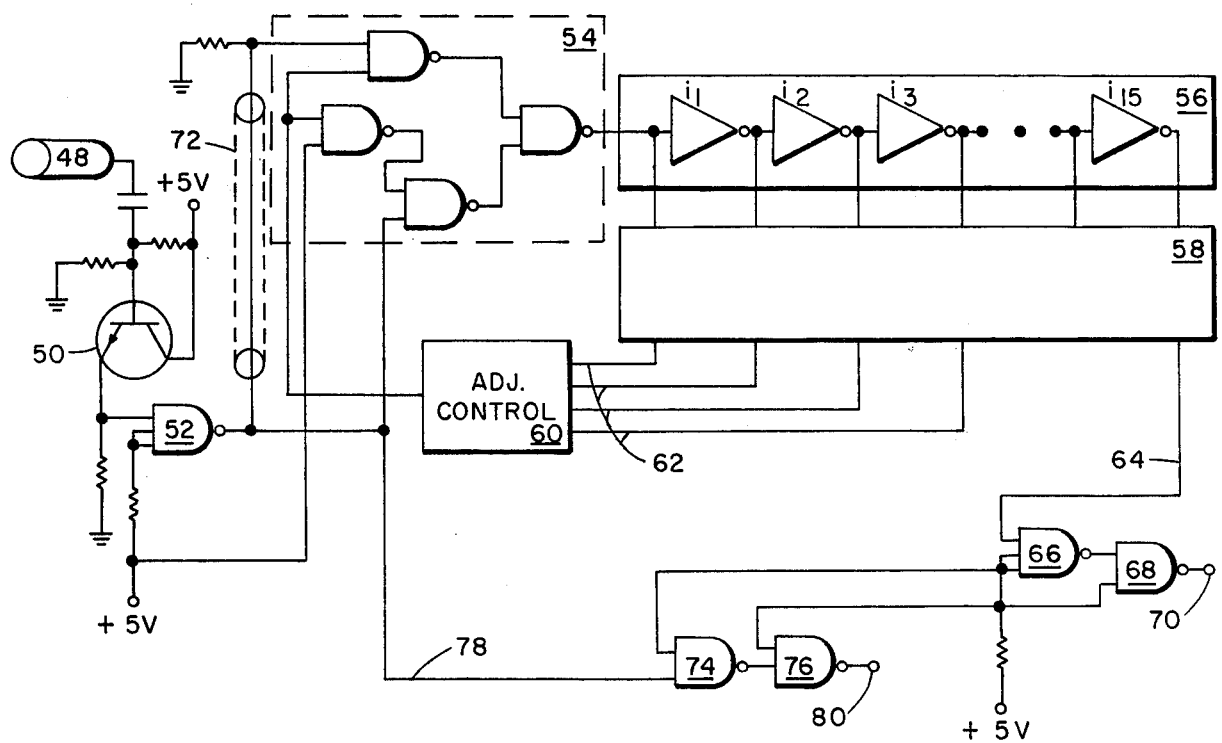
FIG. 4 is a logic diagram illustrating an adjustable delay control for the embodiment of FIG. 1.

Referring to FIG. 4, there is shown a logic circuit which may be suitably employed for an adjustable delay control 18A and 18B and with modification, for an impedance buffer 26A and 26B. Coaxial cable connected 48 may receive a clock signal through clock lead 16A or 16B, which is coupled through transistor 50, three-input NAND gate 52, and delay line select gate 54 to delay line 56. Delay line 56 may comprise a series connection of 15 inverter elements, $i_1$–$i_{15}$, each of which may be an integrated cirucit element, the output of each inverter being coupled into latch 58. Adjustment control 60, which may be manually operated, selects the number N of inverters in delay line 56 through which a clock signal is to be coupled by sending the 4-digit binary word corresponding to N to latch 58 through address lines 62. A clock signal then passes through inverters $i_1$ through $i_N$ and is delayed 3.5 nanoseconds by each inverter, or by 3.5 N nanoseconds. The delayed clock signal is then coupled through latch 58 and conducting path 64, and through three-input NAND gate 66 and NAND gate 68 to output terminal 70. Terminal 70 may be coupled to the clock input of the P/S converter corresponding to the clock lead coupled to cable connector 58. Delay line select gate 54 comprises four NAND gates interconnected as shown, and is provided to enable adjust control 60 to selectively couple delay line 72 into the path of a clock signal to delay the signal by an additional 3 nanoseconds. NAND gates 52, 66 and 68 are provided to match the impedance of the coaxial cable comprising clock lead 16A and 16B to the TTL voltage level of the corresponding P/S converter.

A suitable impedance buffer 26A and 26B coupled between a clock lead 24A and 24B and one of the S/P converters may comprise the buffering NAND gates 74 and 76 shown in FIG. 4, by coupling the output of NAND gate 52 directly to the input of NAND gate 74 through conducting path 78, as shown. A clock signal coupled into coaxial cable connector 48 through a clock lead 24A or 24B would be routed through transistor 50, NAND gate 52, conducting path 78, and NAND gates 74 and 76 to an S/P converter coupled to output terminal 80.

The configuration of circuit elements illustrated in FIG. 4 is particularly useful where a P/S converter and an S/P converter of the switching system are proximately located whereupon the respective elements of an adjustable delay control and of an impedance buffer may be mounted on one circuit board.

Obviously, many modifications and variations of the present invention are possible in the light of the above teachings. It is therefore to be understood that within the scope of the appended claims the invention may be practiced otherwise than as specifically described.

What is claimed is:

1. An apparatus having input means and output means for rapidly coupling digital information in parallel form applied to a selected one of said appartus input means to a selected one of said apparatus output means, said apparatus comprising:
   a. switching means having switch input means and switch output means for rapidly configuring a transmission channel for digital information from a selected one of said switch input means to a selected one of said switch output means in response to a configuration instruction;
   b. configuration control means coupled to said switching means for coupling configuration instructions to said switching means;
   c. parallel-to-serial (P/S) converter means, each of said P/S converter means having its input coupled to one of said apparatus input means and having its output coupled to one of said switch input means, for receiving digital information in parallel form from its coupled apparatus input means and for coupling digital information in serial form to its coupled switch input means;
   d. serial-to-parallel (S/P) converter means, each of said S/P converter means having its output coupled to one of said apparatus output means and having its input coupled through a switch output lead to one of said switch output means for receiving digital information in serial form from its coupled switch output means and for coupling digital information in parallel form to its coupled apparatus output means;
   e. clock means for generating a periodic clock signal, which is coupled to each of said P/S converter means through an adjustable delay control means, and to each of said S/P means through a clock lead, wherein the electrical lengths of the switch output lead coupling digital information and the clock lead coupling a clock signal to the same S/P converter are equal.

2. The apparatus of claim 1 wherein, whenever the output digital information of a selected one of said P/S converter means comprises the input digital information to a selected one of said S/P converters, said selected P/S converter and said selected S/P converter operate synchronously.

3. The apparatus of claim 1 wherein digital information applied to each of said apparatus input means may be simultaneously coupled to one of said apparatus output means.

4. The apparatus of claim 3 wherein each of said P/S converter means may receive digital information in parallel form at a rate in excess of 100 words per second of words up to 36 bits in length and may couple out digital information in serial form at a rate in excess of 10 mega bits per second, and wherein each of said S/P converter means may receive digital information in serial form at a rate in excess of 10 mega bits per second and may couple out digital information in parallel form at a rate in excess of 100 kilo words per second of words up to 36 bits in length.

5. The apparatus of claim 4 wherein the physical lengths of the switch output lead coupling digital information and the clock lead coupling a clock signal to the same S/P converter are equal.

6. The apparatus of claim 5 wherein the said physical length of the said switch output lead and clock lead of one S/P converter means may be different from the said physical length of the said switch output lead and clock lead of another of said S/P converters.

7. The apparatus of claim 6 wherein the number of said apparatus input means is in excess of two-hundred and wherein the number of said apparatus output means is in excess of 200.

8. The apparatus of claim 7 wherein each of said adjustable delay control means includes an adjustment control and a delay line, each of said delay lines comprising a selected number of inverter elements coupled together in series, each of said inverter elements comprising and integrated circuit element.

* * * * *